US005649026A

United States Patent [19]

Heins, III

[11] Patent Number: 5,649,026

[45] Date of Patent: Jul. 15, 1997

[54] APPARATUS FOR DETECTING MARKS ON DOCUMENTS

[75] Inventor: William L. Heins, III, Medford, N.J.

[73] Assignee: Opex Corporation, Moorestown, N.J.

[21] Appl. No.: 342,897

[22] Filed: Nov. 21, 1994

[51] Int. Cl.[6] .......... G06K 9/34

[52] U.S. Cl. .......... 382/175; 382/100; 382/184; 382/317; 235/386; 355/45; 369/176

[58] Field of Search .......... 382/1, 50, 53, 382/173, 317, 112, 175, 184; 358/464, 453, 456, 500, 448, 533; 395/156; 235/386; 355/45; 369/176

[56] References Cited

U.S. PATENT DOCUMENTS

| | | | |
|---|---|---|---|
| 4,300,123 | 11/1981 | McMillin et al. | 382/317 |
| 4,479,194 | 10/1984 | Fogg et al. | 235/386 |
| 4,722,008 | 1/1988 | Ibaraki et al. | 358/456 |
| 4,863,037 | 9/1989 | Stevens et al. | 209/3.1 |
| 4,885,785 | 12/1989 | Reynolds et al. | 382/112 |
| 5,086,486 | 2/1992 | Yamada | 382/50 |
| 5,087,981 | 2/1992 | Ng et al. | 382/50 |
| 5,119,211 | 6/1992 | Sakurai | 358/464 |
| 5,140,440 | 8/1992 | Sasaki | 358/453 |
| 5,144,615 | 9/1992 | Kobayashi | 369/176 |
| 5,182,796 | 1/1993 | Shibayama et al. | 395/156 |
| 5,258,831 | 11/1993 | Kato et al. | 358/500 |
| 5,278,609 | 1/1994 | Sakaida | 355/45 |
| 5,293,431 | 3/1994 | Hayduchok et al. | 382/296 |
| 5,341,227 | 8/1994 | Kumashiro | 382/173 |
| 5,383,754 | 1/1995 | Sumida et al. | 412/11 |
| 5,384,646 | 1/1995 | Godshalk et al. | 358/448 |
| 5,426,519 | 6/1995 | Banton | 358/533 |
| 5,460,273 | 10/1995 | Stevens et al. | 209/584 |

*Primary Examiner*—Jose L. Couso
*Assistant Examiner*—Anh Hong Do
*Attorney, Agent, or Firm*—Dann, Dorfman, Herrell and Skillman, P.C.

[57] ABSTRACT

An apparatus and method is provided for detecting and sorting a document containing an address change request from a group of documents. The apparatus includes a document transport for conveying the document along a selected path of movement. An image scanner positioned along the selected path is provided for reading an image of the document or of a selected area on the document. The image scanner provides density levels corresponding to discrete areas on the document. An image processor determines a set of density levels corresponding to a test line passing through the selected area on the document. Density level transitions are detected along the selected line when two adjacent areas on the document have substantially different density levels. If a sufficient number of density level transitions are detected along the selected line, the document is sorted from the group of documents.

26 Claims, 7 Drawing Sheets

APPARATUS FOR DETECTING MARKS ON DOCUMENTS

FIELD OF THE INVENTION

The present invention generally relates to an apparatus and method for sorting documents and, more specifically, to an apparatus and method for acquiring images of the documents, scanning selected areas of the images, and sorting the documents based on the presence of handwritten markings on the documents.

BACKGROUND OF THE INVENTION

A number of companies and institutions including banks, credit card companies, utility companies, and mail-order houses send out large quantities of bills to their customers on a monthly basis. For the customer's convenience, an invoice stub and a return envelope are generally included with each mailing. When paying their bills, customers typically enter a payment amount on the invoice stub and mail the stub, accompanied by a payment in the form of a bank check or money order, in the return envelope provided.

When processing incoming mail sent by customers, a company typically sorts, either automatically or manually, the mail into selected groups before extracting the contents from the envelopes. In general, such sorting improves the efficiency of the company's mail handling operation. For instance, "singles", which include envelopes with a single invoice stub and a check, are generally separated from the remaining envelopes. The singles can then be diverted to a high-speed automated extractor, which extracts the contents from the envelopes very efficiently. Even if manual extraction is utilized, separating singles from the remaining envelopes results in overall processing efficiency. However, the efficiencies realized from separating singles from a group of envelopes diminishes when address change check-off boxes are used by companies.

As a further convenience to customers, an address change check-off box is usually provided on either the invoice stub or on the return envelope. If a customer's mailing address is incorrect or has changed, the customer is encouraged to request an address change by marking the check-off box with a check or an "X". The customer is further instructed to cross out the incorrect portions of the mailing address on the invoice stub and to write the correct information in a space provided. In this way, the entered changes are forwarded to the company when the customer mails his payment.

Additional check-off boxes may be provided on return envelopes or invoice stubs for various other purposes. For example, a customer may request information about a company's service by marking one check-off box or may place an order for a product by marking another check-off box. All such requests are also forwarded to the company when the customer sends his payment.

Most companies are very concerned about detecting and processing address changes requests in a reliable manner since inaccurate customer addresses result in late payment, and in some instances non-payment, of bills. In addition, reliable address change detection is an important factor contributing to good customer relations. Naturally, customers are happier when their first address change request is accurately detected and processed. With this in mind, companies continually seek the most reliable and efficient methods, either automated or manual, for detecting address change requests.

On the one hand, automated detection of address change requests is more desirable than manual detection because of the lower cost associated with automated processing. However, reliable detection of address change requests using automated systems is complicated, and in many instances compromised, by two significant factors. First, variations encountered during printing of documents oftentimes result in imprecise location of check-off boxes. As a result, automated systems that require exact positioning of check-off boxes may completely miss a marked box or may mistakenly confuse the outline of the box for a customer's marking. Second, customers mark check-off boxes in a number of ways. Therefore, an automated search for a particular type of mark is not practical. For example, some customers check or draw an "X" in the box, while other customers draw a single line or completely color in the box.

On the other hand, manual, instead of automated, detection of address change requests is generally preferred when reliability, rather than cost, is the company's primary concern. A human operator is better suited to detect and adjust for irregularities in printing and variations in customers' markings. However, the cost of labor makes manual sorting very expensive. Consequently, until now, companies were required to balance the benefits and drawbacks provided by automated sorting versus the benefits and drawbacks resulting from manual sorting.

In accordance with the present invention, an apparatus and method are provided to enable reliable detection of markings on documents. The use of the apparatus, in accordance with the present invention, permits efficient and dependable sorting and processing of envelopes and documents.

SUMMARY OF THE INVENTION

The present invention includes an apparatus and method for detecting markings on documents and sorting those documents. The apparatus of the invention may be in the form of a module for in-line operation with a document processing system, such as an envelope sorter or document extractor. When used in such a system, the module communicates the presence or absence of marks to other modules in the system, which in turn sort the documents.

Alternatively, the apparatus may be utilized as a stand-alone unit, in which case documents are transferred from an input bin directly to the unit. If used in the stand-alone configuration, the unit may take and process images of the documents and output the documents to a single output bin. Alternatively, the unit may separate the documents into multiple bins based on the presence or absence of marked check-off boxes.

The operation of the apparatus is generally the same in the stand-alone or the in-line configuration. A document transport is provided for conveying documents along a selected path of the apparatus. An image scanner, such as an optical camera or magnetic ink detector, is positioned along the selected path and is provided for reading an image of a passing document or a selected area on the document. The image scanner has the capability to scan a variety of documents including an envelope or an invoice stub.

The image scanner provides density levels corresponding to discrete areas on the document. For instance, when an optical camera is utilized, light density levels for a series of vertical lines across the selected area containing a check-off box are determined. Generally, each vertical line includes a number of evenly spaced pixels along the line. Density levels along each vertical line may be recorded.

An image processor is included for processing the density levels provided by the image scanner. Initially, at least one imaginary line passing through the check-off box on the document is selected. The selected line may be horizontal, corresponding to a single pixel across a number of adjacent vertical scan lines provided by the camera. Alternatively, the selected line may be vertical, corresponding to an entire vertical scan line or a portion thereof. The selected line may even be diagonal, curved or jagged. Multiple selected lines may be utilized for determining changes in density levels.

Next, the image processor determines which set of density levels corresponds to each of the selected lines. The density levels of each set are scanned in sequence to detect density level transitions, generally white to black or black to white light level transitions, along each selected line. A transition, corresponding to a marking on the document, is detected when two adjacent pixels have substantially different light levels. More specifically, a transition is detected when one discrete area on the line has a density level within a first selected range and another adjacent discrete area has a density level within a second selected range.

As each transition is detected along each selected line, a transition count is incremented. If the transition count is high enough, it indicates that a mark is present in the check-off box. More specifically, if the transition count of one or more lines exceeds a selected transition threshold, presence of a mark in the check-off box is declared.

Documents having a marked check-off box are separated from the remaining documents. In particular, the marked document may be outsorted by activating a gate along the path of movement and thus directing the marked document to a pre-designated output bin. Alternatively, images of the marked documents may be stored in memory for subsequent processing. The marked documents may also be electronically tagged for subsequent outsorting by the document processing system.

BRIEF DESCRIPTION OF THE DRAWINGS

The following summary as well as the following detailed description of the preferred embodiments of the present invention will be better understood when read in conjunction with the appended drawings, in which.

DETAILED DESCRIPTION OF THE PREFERRED EMBODIMENTS

Figure 4:
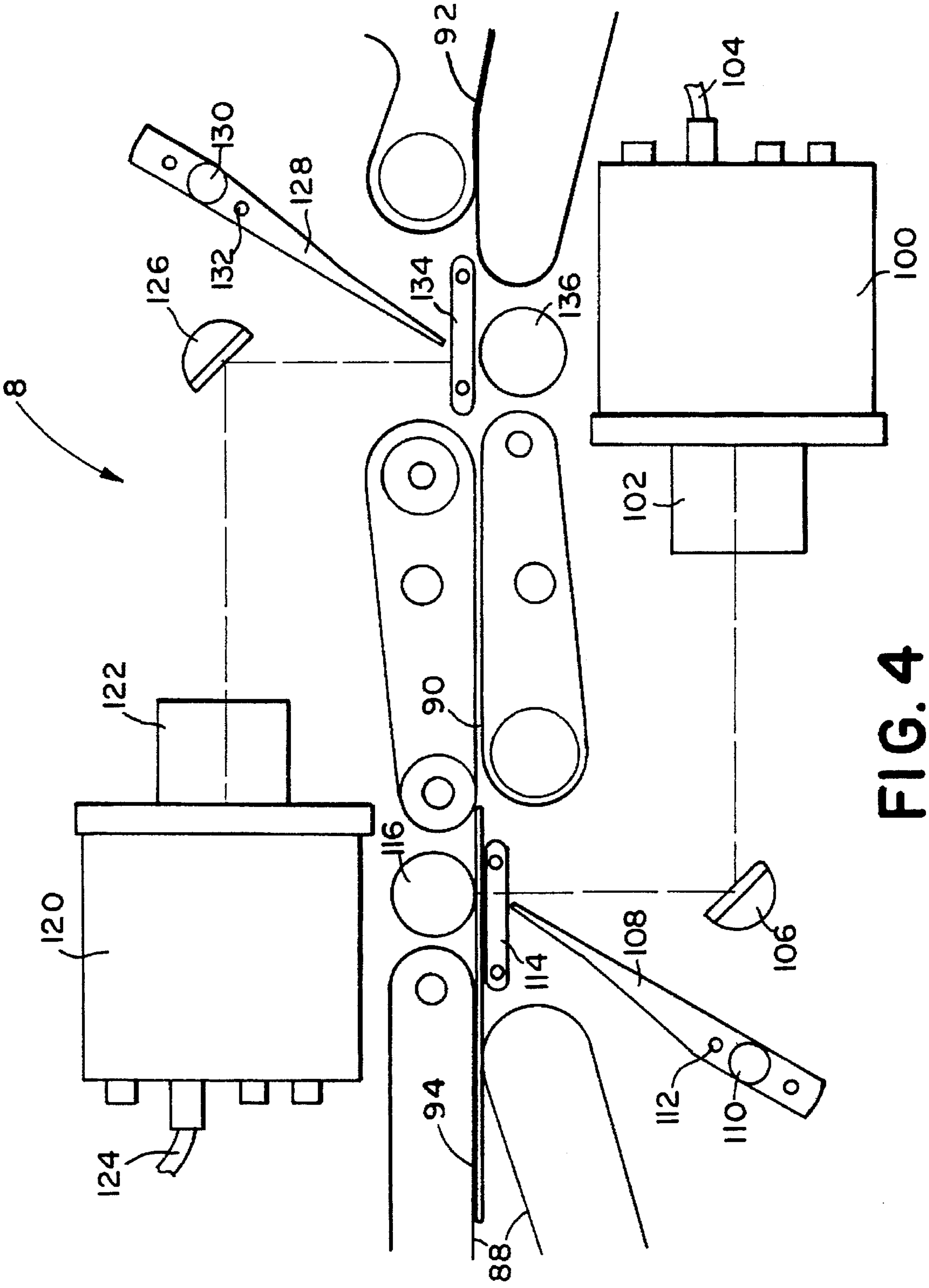
FIG. 4 is an enlarged top plan view of an optical imaging module.

As illustrated in FIG. 4, an optical imaging module, generally designated 8, is provided for detecting marks on envelopes, invoice stubs, etc., collectively referred to as documents. The optical imaging module 8 may be integrated into an automated document processing system, such as a Model 150 document sorter manufactured by Opex Corporation, generally designated 10, shown in FIG. 1. Alternatively, the optical imaging module 8 may be configured as a stand-alone system, in which case, documents are fed from an input bin to the optical imaging module, processed by the image module, and then sorted into one of several output bins by the module.

Figure 1:
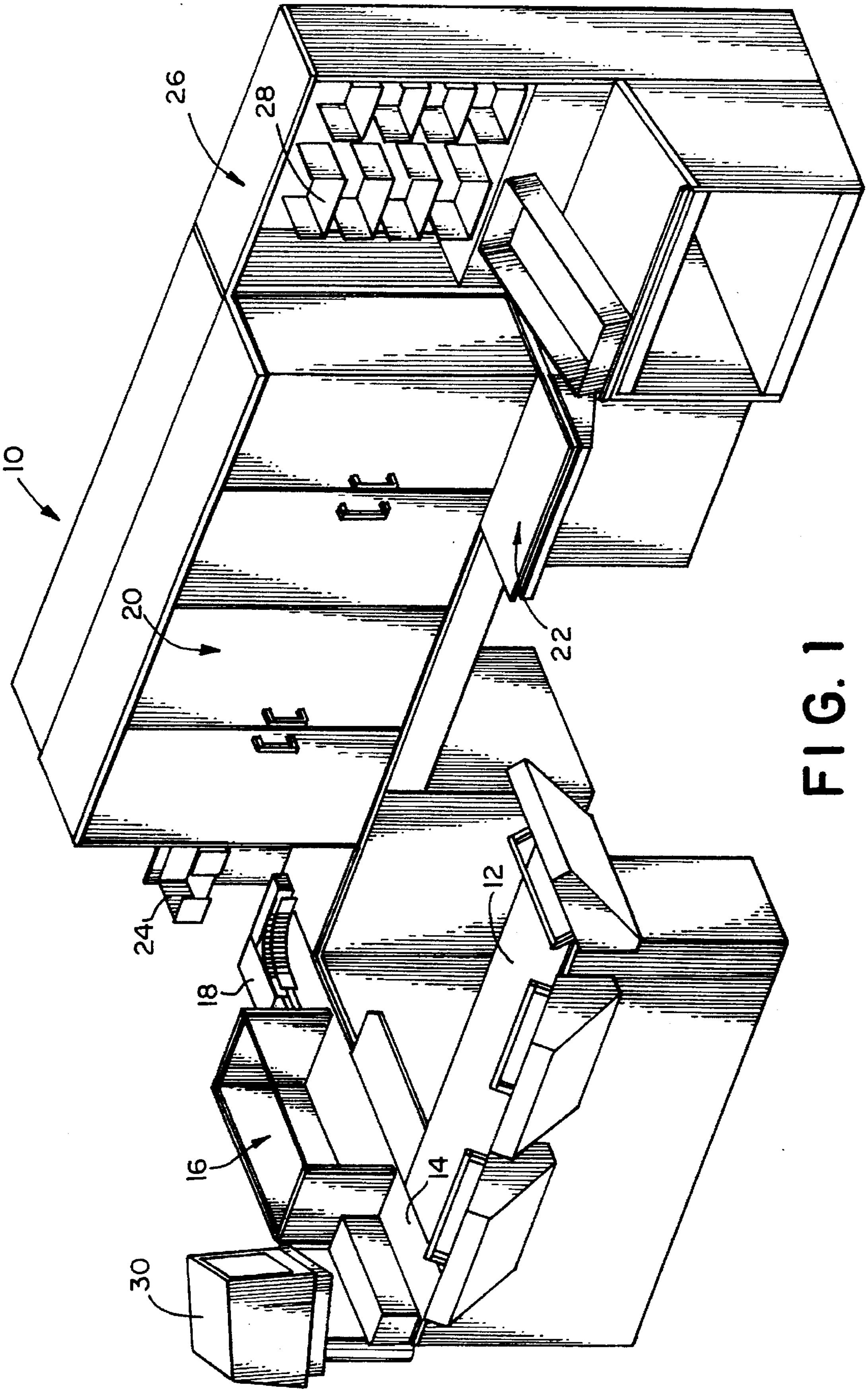
FIG. 1 is a perspective view of a document processing system, which includes at least one imaging module, the system having some of its components removed for clarity.

Regarding the basic operation of the document sorter 10 shown in FIG. 1, an envelope staging area 12 is provided for loading incoming envelopes. An envelope feeder 14 initially feeds the envelopes loaded in the staging area 12 in a serial fashion into the document sorter 10. Thereafter, the fed documents are transported along a pre-determined path of the sorter 10. During such transport, envelopes first pass through an envelope processor 16 that validates singles, i.e., determines which envelopes have two single-sheet documents, generally including an invoice stub and a check. Envelopes that are not valid singles are diverted into outsort area 22. These outsorted envelopes are subsequently removed and processed manually. Valid singles, however, are transported further along the pre-determined path and are automatically processed. More specifically, contents of the valid singles are extracted from the envelope, singulated into a serial orientation and conveyed to contents processor 20. The contents processor 20 distinguishes the invoice from the check, determines the orientation of each, and, if applicable, determines whether a check-off box on the invoice is marked. Then, the pair of documents are ordered and oriented to face the same direction and transported to a stacker 26. Once in the stacker 26, mated pairs of documents are sorted into various output bins 28. For example, paired documents without marked check-off boxes may be directed to one bin, while paired documents having an invoice with a marked check-off box may be directed to another bin.

Figure 2:
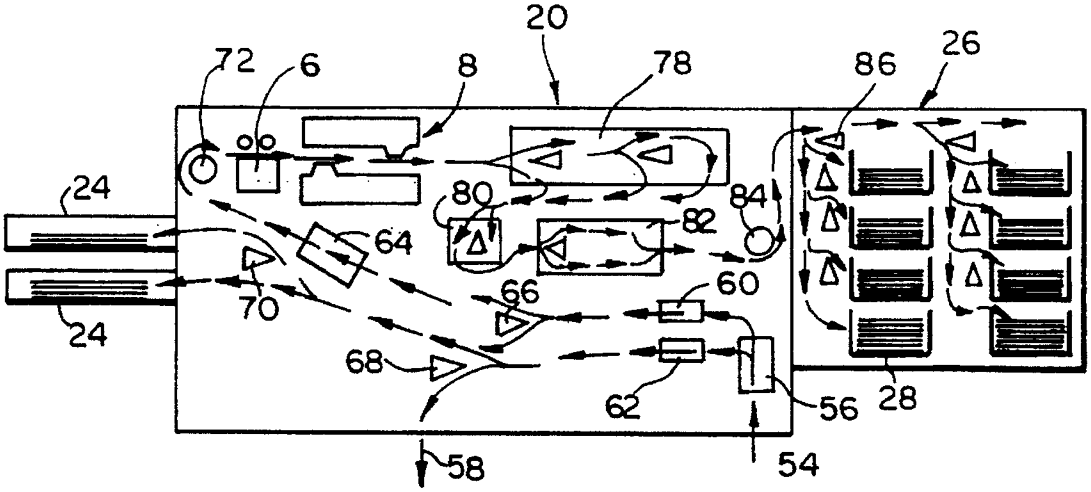
FIG. 2 is a schematic front view showing a flow path of documents through a document extraction and processing section of the document processing system shown in FIG. 1.
Figure 3:
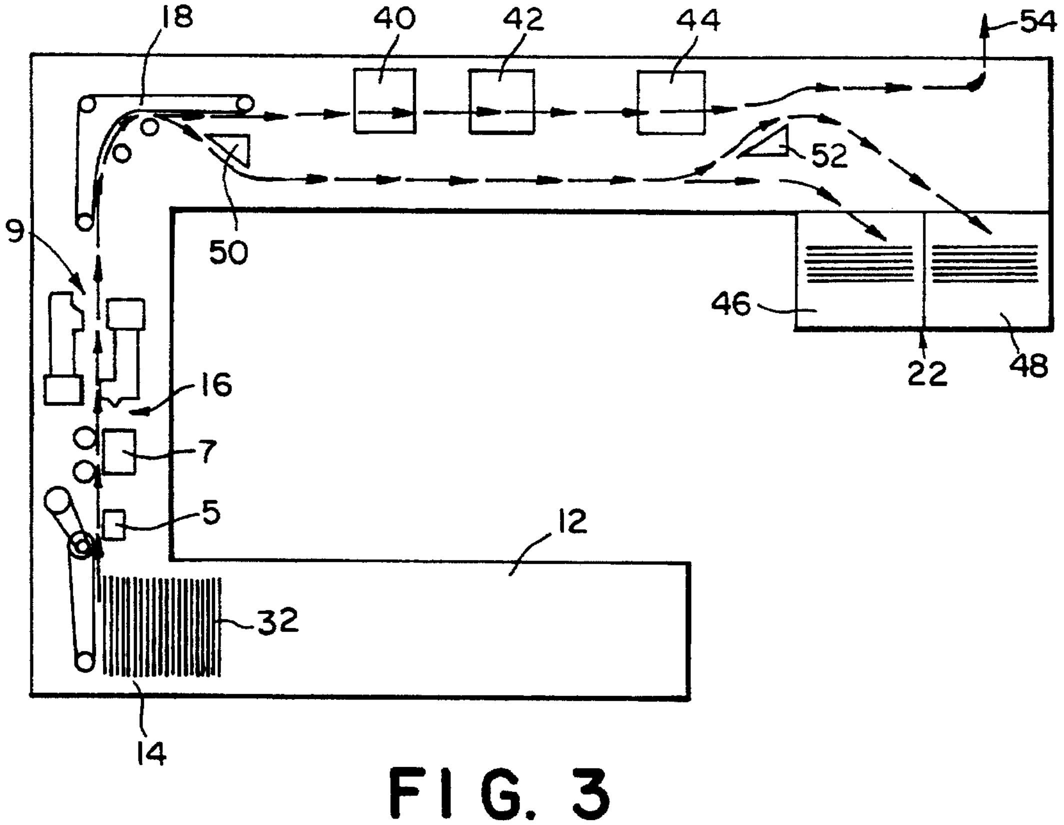
FIG. 3 is a schematic top plan view showing a flow path of documents through an envelope processing section of the document processing system shown in FIG. 1.
Figure 5:
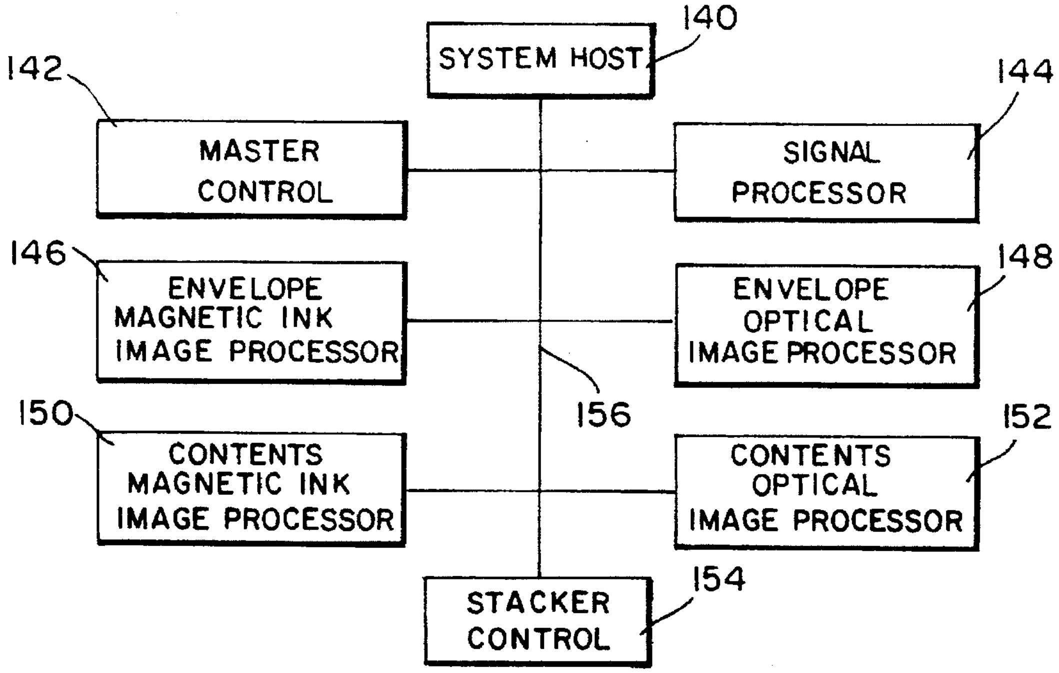
FIG. 5 is a system block diagram of processing modules included in the document sorter of FIG. 1.

The detailed operation of the document sorter 10 may be better understood while referring to FIGS. 2 and 3, which illustrate, in schematic form, the flow path of documents through the sorter 10. The operation of the document processor 10 is controlled by various controllers and processors utilizing the Intel 8152 and Motorola 68030 microprocessors. Referring to FIG. 5, which shows a system block diagram of the sorter 10, a PC-based system host 140 serves as an operator interface to the system and displays the status of the system on display 30. The system host 140 interfaces with the controllers and processors using a high-speed serial link 156, such as the Intel GSC data link. In addition, the controllers and processors communicate with each other via the same serial link 156.

In operation of the document sorter 10, incoming envelopes 32, initially loaded into the staging area 12 are advanced by a conveyor toward the envelope feeder 14. The loaded envelopes 32 are serially fed into the document sorter 10 at regularly spaced intervals. The feeding of envelopes is controlled by a master control 142, which monitors and controls envelope spacing by pulsing (turning on and off) the envelope feeder 14 at the appropriate times.

Each envelope fed into the document sorter 10 is scanned by three modules 5, 7 and 9, which are part of the envelope processor 16 and serve to validate singles. Thickness module 5 is controlled by signal processor 144 and determines whether an envelope contains two single-sheet documents based upon the thickness of the envelope. If the envelope has a thickness within a selected range corresponding to two single-sheet documents, the signal processor 144 declares the envelope a valid single and communicates this decision to the master control 142 via the serial link 156. Otherwise, if the envelope thickness is outside the selected thickness range, the signal processor 144 sends an outsort message to the master control 142.

Envelope magnetic ink imaging module 7 scans the envelope to detect metal objects, such as staples, in the envelope. After scanning is completed, an envelope magnetic ink image processor 146, which controls the magnetic ink imaging module 7, sends a valid single status message to master control 142 if the envelope contains no metal. Otherwise, an outsort message is sent to the master control 142.

Envelope optical imaging module 9 determines the presence or absence of a mark in a check-off box, which may be printed on the envelope. The imaging module 9 may also be used to determine the length and height of the passing envelope. In addition, this module 9 may be used to read printing on the envelope, such as a postal bar code. After image scanning and processing is complete, envelope optical image processor 148, which controls the operation of image module 9, sends a message containing the determined envelope information to the master control 142.

After the master control 142 receives the status messages from modules 5, 7, and 9, it determines whether the envelope should be outsorted. For example, if the master control 142 receives a message from the imaging module 9 that a marked check-off box was detected, the corresponding envelope may be treated as a non-valid single and outsorted to the outsort area 22. The master control 142 outsorts the envelope to the outsort area 22 by controlling the position of gate 50. In addition, the master control 142 sets the position of gate 52 to direct the envelope into a selected outsort bin 46 or 48, located in the outsort area 22.

As an alternative to outsorting the envelope with the marked check-off boxes, the envelope may be electronically tagged as containing a marked box. Such tagging is performed by the envelope optical image processor 148 by sending a marked check-off box status message to the master control 142. Subsequently, the master control 142 processes the tagged envelope like any other valid single, however, tracks the envelope, as well as the pair of documents inside the envelope along the paper path. Finally, when the pair of documents reaches the stacker 26, the pair is sorted into a special output bin 28, which is designated for receiving such documents.

If the master control 142 receives a valid single status from all three envelope processing modules 5, 7, and 9, the gate 50 is set so that the envelope travels along guide 18, rather than being outsorted. The envelope is then cut on three edges by cutters 40, 42 and 44, and proceeds along the paper path 54 to contents processor 20.

The contents processor 20 includes an extractor 56, which separates the envelope from the contents. Thereafter, the envelope passes through thickness detector 62 and the contents of the envelope pass through thickness detector 60. The thickness detectors 60, 62 validate the extraction process. If indeed a proper extraction occurred, the empty envelope is discarded into a trash bin via transport path 58 and the contents continue along the paper path for further processing. In the event that an extraction was unsuccessful, gates 66, 68 and 70 reunite the envelope with the contents and direct the reunited documents to either of two reunite bins 24.

Meanwhile, properly extracted documents are directed to singulator 64, which separates the documents into a side-by-side or serial orientation. The speed of the transport path is doubled at this point to accommodate the side-by-side orientation. Continuing along the path of travel, the singulated pair of documents are justified to a pre-determined height by justifier 72. Such justification ensures consistent positioning so that documents can be properly scanned by contents image modules 6 and 8, which determine the ordering and orientation of documents.

Module 6 is a contents magnetic ink imaging module, similar in construction to envelope magnetic ink imaging module 7. The imaging module 6 is utilized in conjunction with contents magnetic ink image processor 150, which distinguishes a check from an invoice stub and also determines the orientation of the passing check. After the orientation of a check is determined, image processor 150 transmits a status message containing the orientation information to the master control 142.

Module 8 is a contents optical imaging module, similar to the envelope imaging module 9, but is used to optically scan the contents of an envelope, rather than the envelope itself. More specifically, the imaging module 8 scans invoice stubs for address change requests, either by detecting a marked check-off box or by detecting crossed-out characters in the customer's return address area. Contents optical image processor 152 controls the scanning of the imaging module 8 and sends a status message indicating the presence or absence of a mark to the master control 142 after processing of the invoice stub is completed.

Upon receiving ordering and orientation data from the contents imaging processors 150, 152 for a pair of documents, the master control 142 orders and orients the documents. In particular, the master control 142 selects the positioning of gates within modules 78, 80, and 82 to properly orient and order the document pair. Document order module 78 interchanges the positions of a pair of documents by gating the first document behind the second. Reverser module 80 reverses documents by turning them about their vertical axes. Twister module 82 twists documents by turning them about their horizontal axes.

After ordering and orientation, the pair of documents are once again height justified, this time by justifier 84. Finally the document pair is sorted into the stacker 26. Stacking of documents is controlled by stacker control 154, which receives stacking information about the documents from master control 142. The stacker control 154 controls eight gates 86 to sort documents to one of eight bins 28, or optionally, to a second stacker unit. The stacker 26, in addition to stacking oriented pairs of documents, separates a document or a mated pair of documents from the remaining group of documents when a mark is detected in a check-off box on the document.

The operation of the contents optical imaging module 8, used in the contents processor 20, and the envelope optical imaging module 9, used in the envelope processor 16 are alike in construction and operation. Consequently, the following discussion applies to the contents imaging module 8 and envelope imaging module 9, as well as an imaging module configured for operation in a stand-alone operation.

Figure 6:
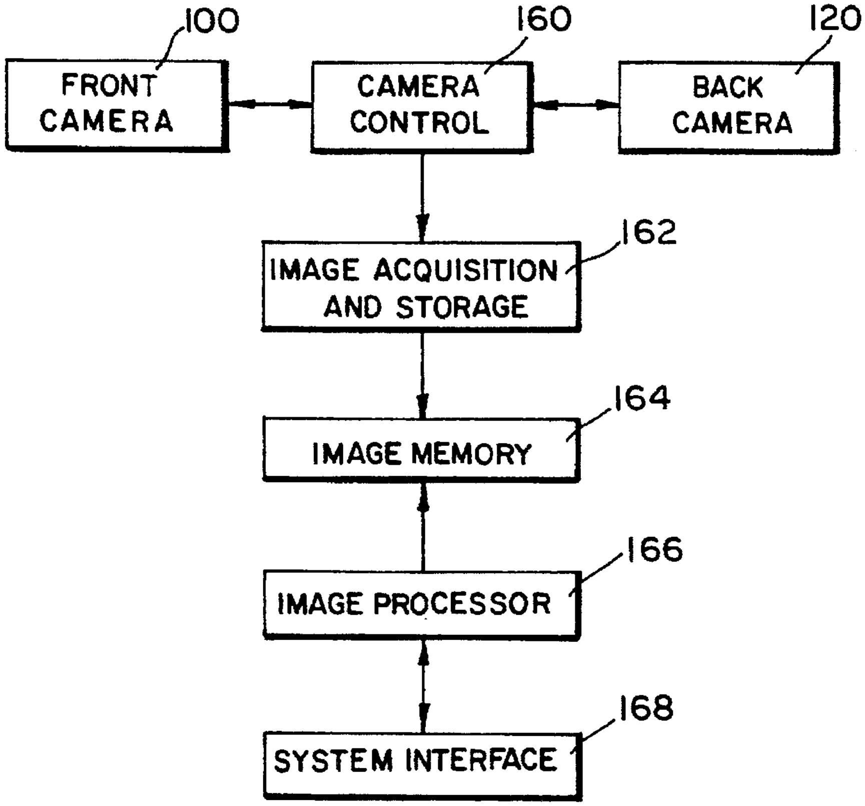
FIG. 6 is a system block diagram of the optical imaging module of FIG. 4.

Referring to FIGS. 4 and 6, front and back cameras 100, 120 are provided for imaging the front and back sides of passing documents. The cameras 100, 120 are line scan cameras of the type manufactured by Dalsa Inc. of Ontario, Canada, Model No. CL-C3-0512G. The cameras provide a single line of 512 vertical data points, or pixels. Each data point corresponds to a light level at a discrete area on the document, ranging in values between 0 and 255.

Camera control 160 configures and controls the cameras 100, 120 by sending and receiving messages via interface cables 104, 124. Fiber optic light arrays 108, 128, which move about pivot pins 110, 130 and are secured by set screws 112, 132, illuminate the passing documents. In addition, mirrors 106, 126 are positioned at approximately 45 degree angles relative to the document path, thereby permitting cameras 100, 120 to be positioned in a generally parallel, longitudinal orientation in relation to the document path. Foam rollers 116, 136 maintain the passing documents in a flat, fixed position against glass plates 114, 134, positioned at the viewing area of the cameras 100, 120, thereby resulting in acquisition of clear, focused images.

In operation, a document 94 is conveyed along the path of movement by input belts 88. Initially, the camera control 160 detects the leading edge of the passing document. A separate optical path sensor located at a fixed distance from the viewing area of the camera 100 may be provided for this purpose. Alternatively, the camera control 160 may detect the leading edge of the document by setting the front camera 100 to a single line scanning mode. During such scanning, if there is no document in the viewing area of the front camera, a generally black image, corresponding to a line of pixels having low light level densities, is detected. However, when the document reaches the viewing area, a comparatively white image is detected, thereby signaling the arrival of the leading edge of the document into the camera viewing area.

After the leading edge of the document is detected, camera control 160 signals front camera 100 to capture an image of the entire document or a selected portion of the document. At the appropriate time, image acquisition and storage 162 transfers the light density level data provided by the front camera 100 into image memory 164. As the document moves along the path of movement, successive vertical line scans of the document are captured by the front camera 100. Finally, when the trailing edge of the document passes the viewing area of the front camera, image acquisition is terminated and image processor 166 is activated to process the data stored in image memory 164. A similar sequence of operations is performed by the back camera 120, in the event a back image of the document is required, for example, when the check-off box is positioned on the back of the invoice stub.

Figure 7:
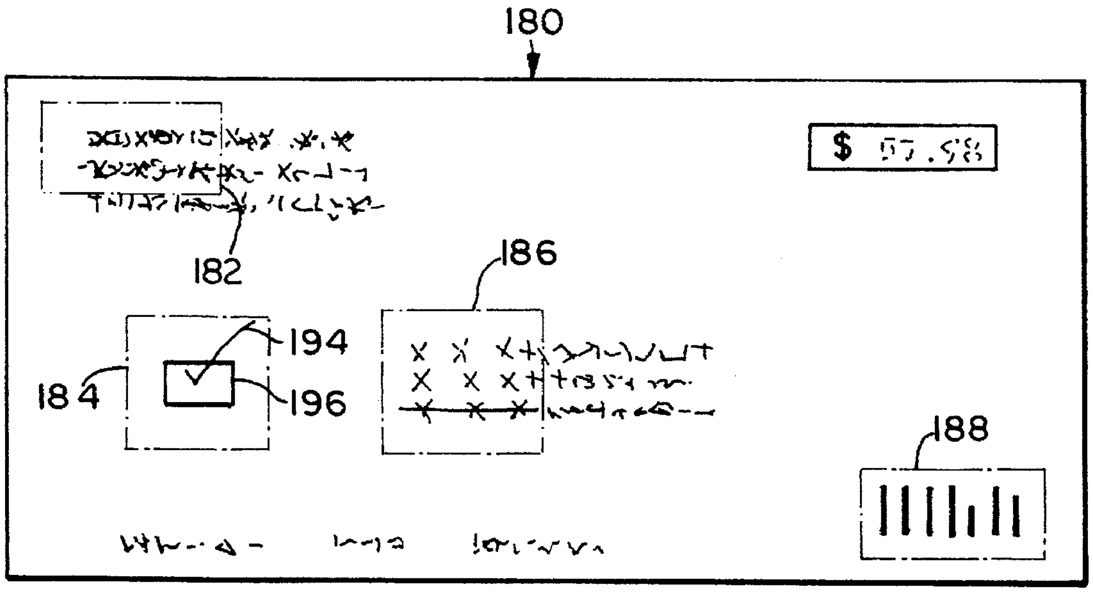
FIG. 7 is a full image of a front side of an invoice stub provided by the optical imaging module.

A typical image of an invoice stub 180, acquired by the imaging module 8, is shown in FIG. 7. The image of the invoice stub 180 includes an address change check-off box 196, which has a marking in the form of handwritten check mark 194. The image processor 166 determines the presence or absence of a mark and sends this information to the master control 142 using the system interface 168.

Figure 10:
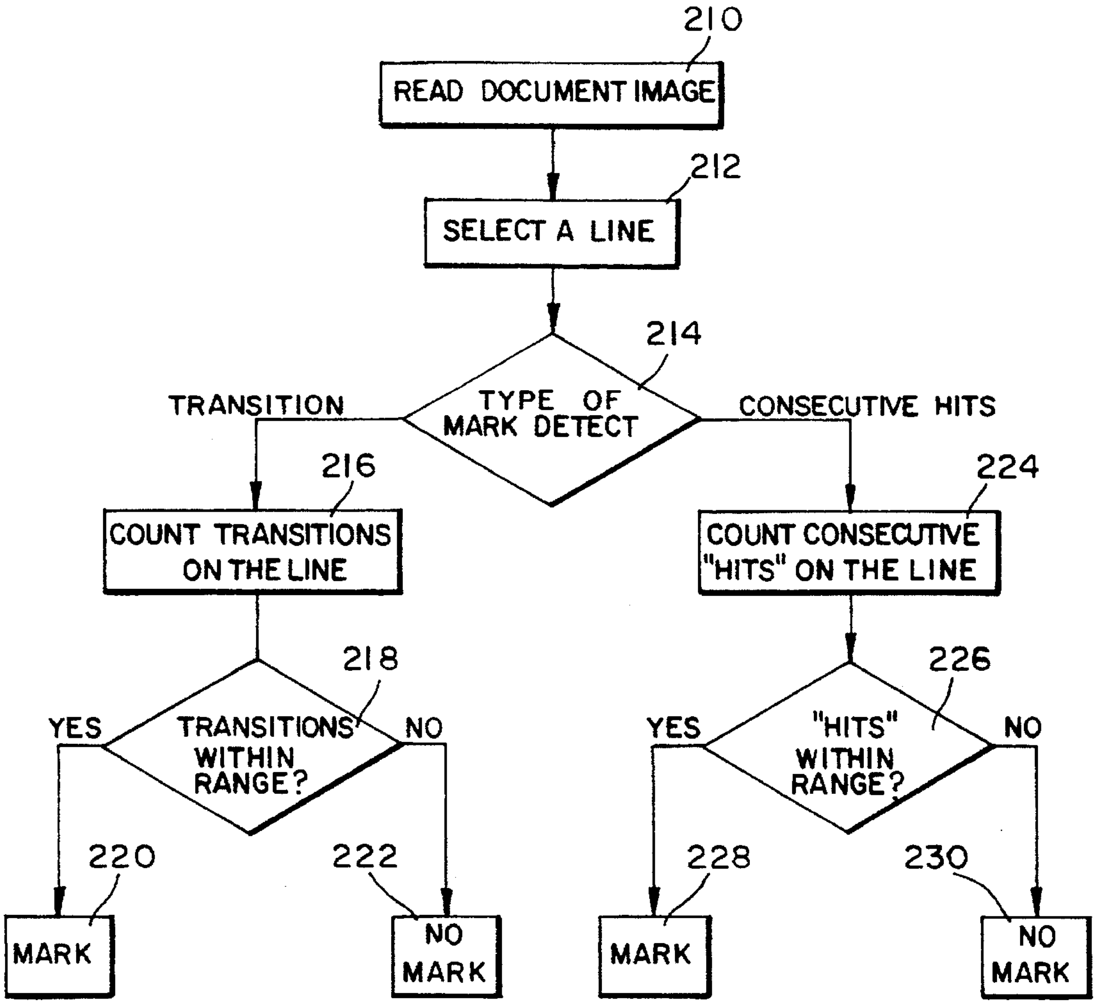
FIG. 10 is a flow chart showing the sequence of operations performed by the optical imaging module to detect a marking on the document.

The sequence of steps that are executed by the image processor 166 when determining the presence of a mark in a check-off box is illustrated in FIG. 10. Initially, a scan zone 184 around the address change check-off box, illustrated by dotted lines in FIG. 7, is selected at step 210. The scan zone 184 corresponds to data that is acquired and processed by the imaging module 8 during mark detection. The size of the scan zone 184 is selected so that an additional scanning area is included around the check-off box 196 to accommodate printing tolerances and slight variations in positioning of the check-off box 196 on the document.

When the image module is used in a stand-alone configuration, the check-off box will generally appear in the same position in the acquired image as long as all the invoice stubs are of the same size and are pre-oriented. This is also the case when the document sorter 10 processes windowed return envelopes, where customers orient the invoice stubs in the envelope prior to mailing so that the company's return address shows through the window. However, when the processed documents are of mixed orientations, e.g., twisted and/or reversed, the check-off box may appear in two different areas on either the front or back image of the passing document. In this case, the orientation of the document must first be determined to ensure proper processing of the selected scan area.

Figure 8:
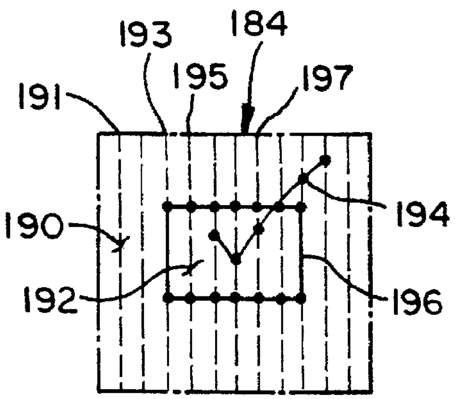
FIG. 8 is an enlarged section of the invoice stub shown in FIG. 7, specifically depicting an enlarged view of a check-off box area on the invoice stub.

After the scan area 184 is selected, a single test line or a series of test lines passing through the scan area are selected at step 212. For instance, a selected series of test lines, which correspond to the vertical scan lines passing through scan zone 184, are illustrated in FIG. 8. The spacing of scan lines is determined by the scanning frequency of the image cameras 100, 120, as well as the speed of travel of the passing documents. Typically, scan lines are acquired at a rate of approximately 80 lines per inch. For simplicity of illustration, the number of scan lines shown in FIG. 8 has been reduced.

After the completion of step 212, the type of mark detect processing is selected at step 214. If transition detection is selected, the number of transitions along each of the selected test lines are counted at step 216. A transition is defined as an area along the test line where the light density changes from a low to high level or a high to low level. In other words, it is a location where a generally white area (no markings present) meets a generally black area (markings present). Alternatively, a transition may be defined as a black marking, in which case a white to black to white density change is required.

After the transition counts are determined for each of the test lines in the scan zone, step 218 is executed. At such time, a determination is made whether the transition counts for each of the test lines is within a selected transition count range. If any of the scan lines has a transition count within the selected range, the imaging module may declare the presence of a marking inside the check-off box. Optionally, the presence of a mark may be declared only when a selected number, rather than one, of the vertical scan lines within the scan zone 184 has a transition count within the selected transition range. As a further option, the presence of a mark may be declared only when a selected number of consecutive vertical lines has a transition count within a selected transition range.

Figure 11:
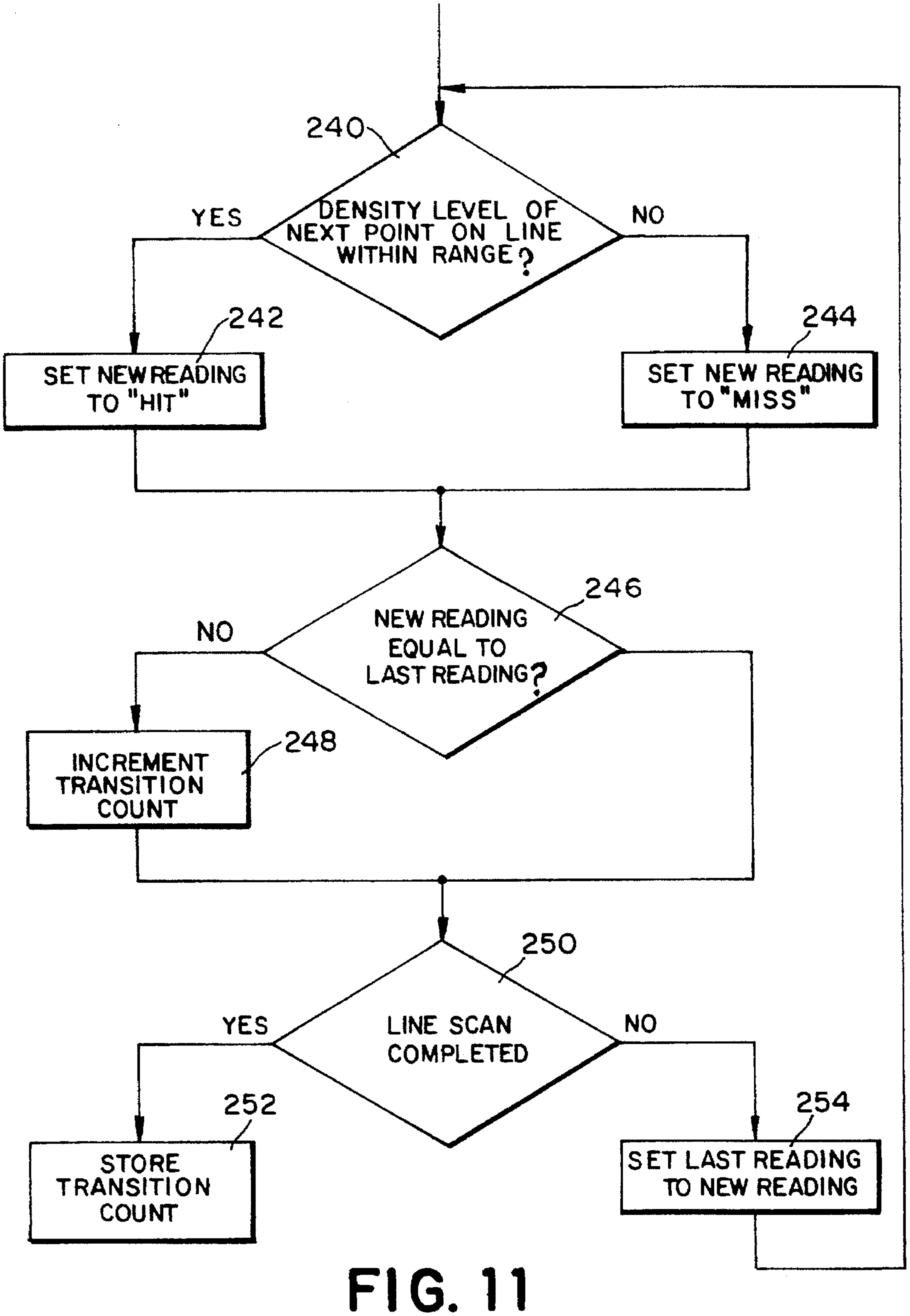
FIG. 11 is a flow chart showing the sequence of operations performed by the optical imaging module to detect transitions along a selected line on the document.

The sequence of steps that are executed to detect a transition along a selected line is illustrated by the flow chart in FIG. 11. For each vertical line, the density level of the first point on the line in the selected scan zone is initially read by the image processor 166 from image memory 164. If this reading falls within a selected density range, the variable LAST READING is set to "HIT". Otherwise, if the reading falls outside the selected density range, the variable LAST READING is set to "MISS". Processing continues at step 240.

At step 240, the density level corresponding to the next point along the vertical line is read by image processor 166 from image memory 164. If the density level of the next point is within the selected density range, the variable NEW READING is set to "HIT" at step 242. Otherwise, the variable NEW READING is set to "MISS" at step 244.

Next, at step 246, the variable NEW READING is compared to the variable LAST READING. If the two variables are not equal (one variable is set to "HIT" and the other to "MISS"), the transition count is incremented at step 248. If both variables are the same, processing resumes at step 250.

If processing of the current line is completed at step 250, the transition count is stored in memory at step 252 and line scanning terminates. Otherwise, the variable LAST READING is set to NEW READING at step 254 and processing continues at step 240, until the entire line is processed.

Referring to FIG. 8, a series of vertical scan lines and several transitions along the lines, shown by black dots, are illustrated. Moving along each of the vertical lines from top to bottom and along the series of vertical lines from left to right, the first transition encountered is along vertical line 191 at point 190. This marking happens to be outside the address change box 196, possibly an extraneous mark or noise picked up by the imaging cameras. Nevertheless, a transition count of two is detected—one two is detected along scan line 193. Another extraneous mark is detected at point 192, resulting in a transition count of 6 for scan line 195. Further transition counts of 6 are detected for the scan lines passing through address change box 196 and the handwritten check mark 194, for example, scan line 197.

Still referring to FIG. 8, a transition count range, for example between 5 and 10, may result in the image module declaring the presence of a mark. Furthermore, if only a single line scan is required to have a transition count within the selected range, the extraneous mark 192 alone would result in a mark present determination. However, if a selected number of lines, for instance 4, are required to have a transition count within the selected range, the presence of the handwritten check mark is still detected, but the extraneous mark by itself does not result in a mark present determination. Similarly, if multiple consecutive lines, for instance 2, are required to have a transition count within the selected range, a mark present determination is still made although the extraneous mark by itself does not cause an erroneous determination.

If the type of mark detect is set at step 214 to consecutive "HITS", processing continues at step 224, rather than step 216. The consecutive "HITS" processing is especially effective in detecting printed characters on the document that are crossed out, commonly done by customers to indicate an incorrect address. For instance, a portion of the customer's address has been crossed out in area 186.

Figure 9:
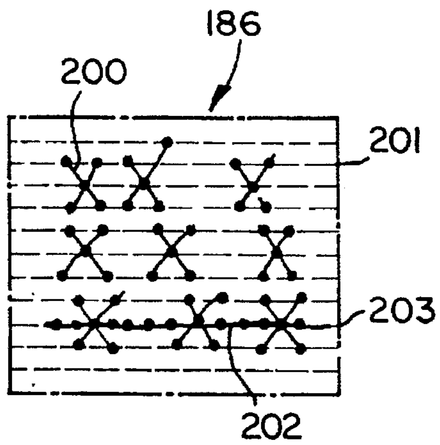
FIG. 9 is an enlarged section of the invoice stub shown in FIG. 7, specifically depicting an enlarged view of a customer's return address area on the invoice stub.

At step 224, the number of consecutive "HITS" along a selected test line is determined. Referring to FIG. 9, "HITS" along several horizontal test lines are shown with black dots. Since there are distinct separations between printed characters on an invoice stub, address lines that are not crossed out contain a relatively small number of consecutive horizontal "HITS". In contrast, a crossed-out area typically has a large number of consecutive horizontal "HITS". Therefore, by scanning in a horizontal direction and counting the maximum number of consecutive "HITS", crossed out areas on the document may be detected. For example, the character 200 shown in area 186 has a maximum consecutive "HITS" count of 1. In comparison, the crossed-out area 202 along horizontal scan line 203 has a consecutive horizontal "HITS" count of 13.

Once the maximum consecutive "HITS" count is determined for each horizontal scan line, processing moves to step 226. At such time, a determination is made whether the consecutive "HITS" count falls within a selected range. If so, the presence of a mark is declared. The low value of the selected range is generally set slightly greater than the consecutive "HITS" for the widest printed character. For example, a horizontal test line across the top of the letter "F" or the letter "T" may result in a consecutive "HITS" total of 3. In order to prevent false mark detection, the lower range for detection of consecutive horizontal "HITS" may be set at 5, for example.

Mark detect processing of consecutive "HITS" may be enhanced to accommodate for skewed cross-out lines, since straight, horizontal scans of skewed lines do not result in a significant number of consecutive "HITS". In the enhanced mode, adjacent horizontal lines may be combined or processed together so that if any of the adjacent lines contain a "HIT", the consecutive "HITS" count is incremented. More specifically, when a "HIT" is detected along a horizontal scan line, the consecutive "HITS" count is incremented, as in the basic consecutive "HITS" mode. The same horizontal line is scanned further as long as consecutive "HITS" are encountered. However, once a "MISS" is detected, adjacent horizontal lines are scanned for a "HIT". Consequently, even if a skewed cross-out line crosses over to multiple horizontal lines, the skewed line is detected. Furthermore, if all the printed characters on an invoice stub are in vertical alignment, all of the horizontal lines passing through the address area may be simultaneously scanned to detect any cross-out lines in the address area. In this mode, the consecutive "HITS" count is incremented as long as at least one vertically aligned point, on any of the horizontal lines, is a "HIT".

The method for detecting address change marks may also be utilized to detect markings on documents for other purposes. Such mark detection may be useful to orient a document, for example. More specifically, document orientation may be accomplished by selecting scan zones that are symmetrically positioned relative to the center point of the document. Then, transition mark detect processing may be used to detect transition counts along test lines in the selected zones. Orientation is determined based on a differential of transitions in the two selected zones. For example, the document shown in FIG. 7 may be oriented by selecting two symmetrical scan zones 182 and 188. Although each zone contains printing, the orientation of the document may, nevertheless, be determined. The transition counts of the selected vertical scan lines passing through the printed characters in box 182 are greater than the transition counts of the selected vertical scan lines passing through the solid vertical bars in box 188. Consequently, if the document passes the camera in an upside down orientation, box 188 would have the greater number of transitions, thereby indicating that the document is upside down. The determination of document orientation may be extended to include documents facing in the opposite direction by using both the front and back cameras 100, 120.

Alternatively, the consecutive "HITS" processing mode may be implemented to detect the orientation of the document shown in FIG. 7. In particular, if consecutive "HITS" are counted along vertical lines, rather than horizontal lines, the vertical bars shown in zone 188 result in a higher count of consecutive "HITS" than the printed characters in box 182. Accordingly, document orientation may be determined.

Furthermore, the methods for detecting marks using optical scanners, may also be used in connection with other types of imaging modules. For example, envelope magnetic ink module 7 and contents magnetic ink module 6 may be used to detect magnetic markings on various documents. Such an implementation may be useful, for instance, when determining orientations of invoice stubs. In particular, if an invoice stub is printed with magnetic ink, a magnetic ink image of a stub may be acquired. Selected areas of the acquired image may then be scanned using the transition detect or consecutive "HITS" processing mode to determine the orientation of the stub, similar to the method employed for detecting document orientation by the optical imaging module.

It will be recognized that changes or modifications may be made without departing from the broad inventive concepts of the invention. It should therefore be understood that this invention is not limited to the particular embodiments described herein, but is intended to include all changes and modifications that are within the scope and spirit of the invention as set forth in the claims.

What is claimed is:

1. An apparatus for sorting a document having a mark from a group of documents comprising:

(a) a document transport for conveying the documents along a selected path of movement;

(b) an image scanner positioned along the selected path for reading an image at a selected area on the documents, the image scanner providing density levels at discrete areas within the selected area on the documents;

(c) an image processor responsive to the image scanner for determining a set of density levels corresponding to the discrete areas along a selected line through the selected area;

(d) a transition detector for determining density level transitions between discrete areas along the selected line; and (e) a gate along the path of movement responsive to the image processor for sorting the document to a selected location when a number of the density level transitions exceeds a selected transition threshold.

2. The apparatus as recited in claim 1 wherein the image processor includes a vertical line processor for determining a set of density levels corresponding to the discrete areas along a selected vertical line through the selected area generally transverse to the path of movement and wherein the transition detector includes a vertical transition detector for determining the density level transitions between discrete areas along the selected vertical line.

3. The apparatus as recited in claim 1 wherein the image processor includes a line processor for determining sets of density levels, each set corresponding to the discrete areas along a different one of a plurality of selected lines through the selected area and wherein the transition detector determines the density level transitions between discrete areas along each of the selected lines and wherein the gate sorts the document when the number of the density level transitions along at least one of the selected lines exceeds the selected transition threshold.

4. The apparatus as recited in claim 1 wherein the image processor includes a line processor for determining sets of density levels, each set corresponding to the discrete areas along a different one of a plurality of selected lines through the selected area and wherein the transition detector determines the density level transitions between discrete areas along each of the selected lines and wherein the gate sorts the document when the number of the density level transitions along at least a selected number of the selected lines exceeds the selected transition threshold.

5. The apparatus as recited in claim 1 wherein the image processor includes a line processor for determining sets of density levels, each set corresponding to the discrete areas along a different one of plurality of selected adjacent lines through the selected area and wherein the transition detector determines the density level transitions between discrete areas along each of the selected lines and wherein the gate sorts the document when the number of the density level transitions along at least a selected number of consecutive adjacent selected lines exceeds the selected transition threshold.

6. The apparatus as recited in claim 1 wherein the image processor includes a density processor for determining the density levels in the set exceeding a selected density threshold and wherein the transition detector is responsive to the density processor for determining density level transitions between discrete areas along the selected line when one of the discrete areas has a density level that exceeds the selected density threshold.

7. The apparatus as recited in claim 1 wherein the image processor includes a mark-length detector for determining a number of consecutive discrete areas along the selected line of the selected area having density levels within a selected density range and wherein the gate sorts the document when the number of the density level transitions exceeds the selected transition threshold and when the number of consecutive discrete areas having density levels within the selected density range exceeds a selected consecutive threshold.

8. The apparatus as recited in claim 1 comprising a camera for viewing the documents and wherein the image scanner provides light levels at discrete areas within the selected area on the documents.

9. An apparatus for orienting documents having different orientations comprising:

(a) a document transport for conveying the documents along a selected path of movement;

(b) an image scanner positioned along the selected path for reading images at two selected areas symmetrically located about the center point of the documents, the image scanner providing density levels at discrete areas within the selected areas on the documents;

(c) an image processor responsive to the image scanner for determining two sets of density levels, each set corresponding to the discrete areas along a different one of two selected lines, each selected line passing through a different one of the selected areas;

(d) a transition detector responsive to the image processor for determining density level transitions between discrete areas along the two selected lines;

(e) an orientation detector responsive to the transition detector for determining the orientation of the documents when a number of the density level transitions along one of the selected lines is within a selected transition range; and (f) a document orienter along the path of movement responsive to the orientation detector for orienting the documents of different orientations to desired orientations based on the orientations of the documents determined by the orientation detector.

10. An apparatus for detecting a mark on a document comprising:

(a) an image scanner for reading an image at a selected area on the document, the image scanner providing density levels at discrete areas within the selected area on the documents;

(b) an image line processor responsive to the image scanner for determining a set of density levels corresponding to discrete areas along a selected line through the selected area;

(c) a transition detector responsive to the image line processor for detecting density level transitions between discrete areas along the selected line through the selected area; and (d) a mark detector for determining the presence of the mark on the document when a number of the density level transitions exceeds a lower transition threshold.

11. The apparatus as recited in claim 10 wherein the image line processor determines sets of density levels, each set corresponding to the discrete areas along a different one of a plurality of selected lines through the selected area and wherein the transition detector determines the density level transitions between discrete areas along each of the selected lines and wherein the mark detector determines the presence of the mark on the document when the number of the density level transitions along a selected number of the selected lines exceeds the lower threshold.

12. The apparatus as recited in claim 10 wherein the image line processor determines sets of density levels, each set corresponding to the discrete areas along a different one of a plurality of selected lines through the selected area and wherein the transition detector determines the density level transitions between discrete areas along each of the selected lines and wherein the mark detector determines the presence of the mark on the document when the number of the density level transitions along each of a selected number of the selected lines exceeds the lower threshold.

13. An apparatus for detecting a mark on a document comprising:

(a) a document transport for conveying a group of documents along a selected path of movement;

(b) an image scanner positioned along the selected path for reading an image at a selected area on the documents, the image scanner providing density levels at discrete areas within the selected area on the documents;

(c) an image line processor responsive to the image scanner for determining a set of density levels corresponding to the discrete areas along a selected line through the selected area;

(d) a mark-length detector responsive to the image line processor for determining a number of consecutive discrete areas along the selected line having density levels within a selected density range and for determining a presence of the mark on the document when the number of consecutive discrete areas along the selected line having density levels within the selected density range exceeds a selected length threshold.

14. The apparatus as recited in claim 13 comprising a memory for storing density levels at discrete areas within the selected area on the documents when the number of consecutive discrete areas along the selected line having density levels within the selected density range exceeds the selected length threshold.

15. The apparatus as recited in claim 13 comprising a gate along the path of movement responsive to the mark-length detector for diverting the document when the number of consecutive discrete areas along the selected line having density levels within the selected density range exceeds the selected length threshold.

16. A method for detecting a mark on a document comprising the steps of:

(a) reading an image at a selected area on the document;

(b) providing density levels at discrete areas within the selected area on the documents;

(c) determining a set of density levels corresponding to discrete areas along a selected line through the selected area;

(d) detecting density level transitions between discrete areas along the selected line through the selected area; and (e) determining the presence of the mark on the document when a number of the density level transitions exceeds a lower transition threshold.

17. The method as recited in claim 16 comprising the step of storing the density levels at discrete areas within the selected area on the documents when the number of the density level transitions exceeds the lower transition threshold.

18. The method as recited in claim 16 comprising the step of sorting the document when the number of the density level transitions exceeds the lower transition threshold.

19. The method as recited in claim 18 comprising the step of storing the density levels at discrete areas within the selected area on the documents when the number of the density level transitions exceeds the lower transition threshold.

20. An apparatus for sorting a document having a mark from a group of documents comprising:

(a) an image scanner for reading an image at a selected area on the document, the image scanner providing density levels at discrete areas within the selected area on the documents;

(b) an image line processor responsive to the image scanner for determining a set of density levels corresponding to discrete areas along a selected line through the selected area;

(c) a transition detector responsive to the image line processor for detecting density level transitions between discrete areas along the selected line through the selected area;

(d) a mark detector for determining the presence of the mark on the document when a number of the density level transitions exceeds a lower transition threshold; and (e) a sorter along the path of movement responsive to the image processor for sorting the document to a selected location when a number of the density level transitions exceeds a selected transition threshold.

21. The apparatus as recited in claim 20 wherein the image line processor determines sets of density levels, each set corresponding to the discrete areas along a different one of a plurality of selected lines through the selected area and wherein the transition detector determines the density level transitions L between discrete areas along each of the selected lines and wherein the mark detector determines the presence of the mark on the document when the number of the density level transitions along a selected number of the selected lines exceeds the lower threshold.

22. The apparatus as recited in claim 20 wherein the image line processor determines sets of density levels, each set corresponding to the discrete areas along a different one of a plurality of selected lines through the selected area and wherein the transition detector determines the density level transitions between discrete areas along each of the selected lines and wherein the mark detector determines the presence of the mark on the document when the number of the density level transitions along each of a selected number of the selected lines exceeds the lower threshold.

23. An apparatus for detecting a mark on a document comprising:

(a) a document transport for conveying a group of documents along a selected path of movement;

(b) an image scanner positioned along the selected path for reading an image at a selected area on the documents, the image scanner providing density levels at discrete areas within the selected area on the documents;

(c) an image processor responsive to the image scanner for determining a set of density levels corresponding to the discrete areas along a selected line through the selected area, wherein the selected line follows one of a diagonal, curved or jagged path through the selected area; and (d) a mark-length detector responsive to the image processor for determining a number of consecutive discrete areas along the selected line having density levels within a selected density range and for determining the presence of the mark on the document when the number of consecutive discrete areas along the selected line having density levels within the selected density range exceeds a selected length threshold.

24. An apparatus as recited in claim 23 comprising a sorter along the path of movement responsive to the image processor for sorting the document to a selected location when the number of consecutive discrete areas along the selected line having density levels within the selected density range exceeds the selected length threshold.

25. An apparatus for detecting a mark on a document comprising:

(a) a document transport for conveying a group of documents along a selected path of movement;

(b) an image scanner positioned along the selected path for reading an image at a selected area on the documents, the image scanner providing density levels at discrete areas within the selected area on the documents;

(c) an image processor responsive to the image scanner for determining a set of density levels corresponding to the discrete areas along a plurality of adjacent selected lines through the selected area; and (d) a mark-length detector responsive to the image processor for determining a number of consecutive discrete areas within the plurality of adjacent selected lines having density levels within a selected density range and for determining the presence of the mark on the document when the number of consecutive discrete areas anywhere across the plurality of selected lines having density levels within the selected density range exceeds a selected length threshold.

26. An apparatus as recited in claim 25 comprising a sorter along the path of movement responsive to the image processor for sorting the document to a selected location when the number of consecutive discrete areas within the plurality of adjacent selected lines having density levels within the selected density range exceeds the selected length threshold.

* * * * *